US012668448B2

(12) United States Patent
Li et al.

(10) Patent No.: US 12,668,448 B2
(45) Date of Patent: Jun. 30, 2026

(54) HIGH-SPEED CUTTING DEVICE

(71) Applicant: SHENZHEN GEESUN INTELLIGENT TECHNOLOGY CO., LTD., Guangdong (CN)

(72) Inventors: Panpan Li, Guangdong (CN); Wenwu Pang, Guangdong (CN); Shunnan Cao, Guangdong (CN); Xueke Wu, Guangdong (CN); Rukun Yang, Guangdong (CN)

(73) Assignee: SHENZHEN GEESUN INTELLIGENT TECHNOLOGY CO., LTD., Guangdong (CN)

( * ) Notice: Subject to any disclaimer, the term of this patent is extended or adjusted under 35 U.S.C. 154(b) by 997 days.

(21) Appl. No.: 17/740,522

(22) Filed: May 10, 2022

(65) Prior Publication Data

US 2023/0014163 A1 Jan. 19, 2023

(30) Foreign Application Priority Data

Jul. 15, 2021 (CN) .......................... 202110802655.0

(51) Int. Cl.
B65H 27/00 (2006.01)
B23D 25/04 (2006.01)
(Continued)

(52) U.S. Cl.
CPC ............. B65H 27/00 (2013.01); B23D 25/04 (2013.01); B26D 1/565 (2013.01); B65H 26/02 (2013.01);
(Continued)

(58) Field of Classification Search
CPC ........ B23D 25/00; B23D 25/02; B23D 25/04; B23D 25/08; B23D 25/12; Y10T 83/4757;
(Continued)

(56) References Cited

U.S. PATENT DOCUMENTS

| | | | | |
|---|---|---|---|---|
| 3,803,966 A | * | 4/1974 | Plegat | B23D 25/04 83/319 |
| 3,808,928 A | * | 5/1974 | Plegat | B23D 45/20 83/306 |

(Continued)

FOREIGN PATENT DOCUMENTS

| | | |
|---|---|---|
| CN | 207973290 U | 10/2018 |
| CN | 110000273 A | 7/2019 |

(Continued)

OTHER PUBLICATIONS

Notice of Allowance (=Notification to Grant Patent Right for Invention) for Japanese Patent Application No. 2022-077981 issued by the Japanese Patent Office on Oct. 26, 2023.
(Continued)

*Primary Examiner* — Laura M Lee
(74) *Attorney, Agent, or Firm* — IP & T GROUP LLP

(57) ABSTRACT

A high-speed cutting device includes a mounting frame, a feeding mechanism, a linear chasing-cutting mechanism, an electrode guide plate, and an acceleration driving mechanism, the acceleration driving mechanism is provided on the discharging side of the electrode guide plate, and configured to perform acceleration driving on a material tape. The acceleration driving mechanism is provided behind the linear chasing-cutting mechanism to realize the acceleration driving of the material tape.

6 Claims, 3 Drawing Sheets

<u>100</u>

(51) Int. Cl.
B26D 1/56 (2006.01)
B26D 7/18 (2006.01)
B65H 26/02 (2006.01)

(52) U.S. Cl.
CPC ...... *B26D 7/1863* (2013.01); *B65H 2404/115* (2013.01)

(58) Field of Classification Search
CPC .......... Y10T 83/4763; B65H 2404/115; B65H 26/02; B65H 27/00; B26D 7/1863; B26D 1/565
USPC .......................................... 156/289; 29/623.1
See application file for complete search history.

(56) References Cited

U.S. PATENT DOCUMENTS

| | | | | | |
|---|---|---|---|---|---|
| 3,915,041 | A | * | 10/1975 | Trofimov | B23D 25/04 83/310 |
| 4,394,829 | A | * | 7/1983 | Stoehr | B23D 25/04 83/320 |
| 5,287,782 | A | * | 2/1994 | Scott | B23Q 3/002 83/450 |
| 5,826,479 | A | * | 10/1998 | Suzuki | B23D 25/04 83/318 |
| 5,931,075 | A | * | 8/1999 | Yamaguchi | B26D 1/24 83/321 |
| 5,950,513 | A | * | 9/1999 | Bourakovski | B26D 1/60 83/318 |
| 8,333,093 | B2 | * | 12/2012 | Kleckner | B21D 7/08 72/203 |
| 9,211,599 | B2 | * | 12/2015 | Farina | H01M 4/73 |

FOREIGN PATENT DOCUMENTS

| | | | |
|---|---|---|---|
| CN | 212823132 | U | 3/2021 |
| JP | S53-082883 | U | 12/1976 |
| JP | S58-071059 | A | 4/1983 |
| JP | S61-176455 | A | 8/1986 |
| JP | 2006-000951 | A | 1/2006 |
| JP | 2008-200788 | A | 9/2008 |
| JP | 2009-522105 | A | 6/2009 |
| JP | 2016-173884 | A | 9/2016 |
| KR | 10-1322774 | B1 | 10/2013 |
| KR | 10-1479724 | B1 | 1/2015 |
| KR | 10-1868311 | B1 | 6/2018 |
| WO | 2012/110915 | A1 | 8/2012 |

OTHER PUBLICATIONS

European Search Report for European Patent Application No. 22172181.4 issued by the European Patent Office on Oct. 31, 2022.
Office Action for European Patent Application No. 22172181.4 issued by the European Patent Office on Nov. 14, 2022.
Office Action for Japanese Patent Application No. 2022-077981 issued by the Japanese Patent Office on Jun. 23, 2023.
Office Action for Chinese Patent Application No. 202110802655.0 issued by the Chinese Patent Office on Sep. 12, 2024.
Notification to Grant Patent Right for Invention for Japanese Patent Application No. 2022-077981 issued by the Japanese Patent Office on Oct. 31, 2023.
Notification to Grant Patent Right for Invention for Korean Patent Application No. 10-2022-0057286 issued by the Korean Patent Office on Sep. 8, 2025.

* cited by examiner

HIGH-SPEED CUTTING DEVICE

CROSS-REFERENCE TO RELATED APPLICATION

The present disclosure claims priority to Chinese patent application with the filing number 202110802655.0 filed on Jul. 15, 2021 with the Chinese Patent Office, and entitled "High-speed Cutting Device", the contents of which are incorporated herein by reference in entirety.

TECHNICAL FIELD

The present disclosure relates to the technical field of lithium cell manufacturing, in particular to a high-speed cutting device.

BACKGROUND ART

The "laminated-type" jellyrolls of lithium power cells are composed of positive and negative electrodes (cathode and anode) and separator that are stacked together at intervals, currently, they are divided into "Z-shaped" stacks, "bag-making" stacks and "thermal compounding" stacks, wherein the "thermal compounding" stack is a new way of molding jellyrolls, and in the process of lamination preparation, due to the reason that the cutting efficiency of the electrode is slow, the cutting precision is low, and the long-distance roller feeding drive easily leads to material blockage and the like, it has not been widely generalized in the lithium cell industry; when the jellyrolls are manufactured, the two lamination processes of "Z-shaped" stack and "bag-making" stack have also obvious defects that cannot be resolved at present, such as slow efficiency, high short-circuit detection rejection rate, and easy dislocation of jellyrolls during transportation.

At present, in the production line of lithium cell, the material tape needs to be stopped or slowed down during cutting to ensure the cutting accuracy, which undoubtedly reduces the efficiency of lamination preparation. Alternatively, the material tape is cut by using the linear chasing-cutting method, at this time, the movement speed and acceleration of the linear motor are required to be relatively large to ensure the chasing-cutting function, however, this method is also difficult to ensure the cutting accuracy, and the stability of the mechanism is difficult to be guaranteed.

SUMMARY

The objects of the present disclosure include, for example, providing a high-speed cutting device, which can improve the precision and efficiency of lamination (stacking) preparation, and simultaneously, also improve the stability of the mechanism better.

Embodiments of the present disclosure can be implemented as follows.

In a first aspect, the present disclosure provides a high-speed cutting device, which comprises a mounting frame, a feeding mechanism, linear chasing-cutting mechanism, an electrode guide plate and an acceleration driving mechanism, wherein the feeding mechanism, the linear chasing-cutting mechanism and the acceleration driving mechanism are all provided on the mounting frame, the feeding mechanism is configured to convey the material tape, the linear chasing-cutting mechanism is provided above the feeding mechanism, connected to the feeding mechanism, and configured to perform the linear chasing-cutting on the material tape, the electrode guide plate is provided on the discharging side of the feeding mechanism, and configured to guide the material tape after cutting, and the acceleration driving mechanism is provided on the discharging side of the electrode guide plate, and configured to perform acceleration driving on the material tape.

In an optional embodiment, the acceleration driving mechanism comprises an acceleration mounting seat, a first acceleration rollers group and a second acceleration rollers group, and the acceleration mounting seat is provided on the mounting frame, the first acceleration rollers group and the second acceleration rollers group are provided on the acceleration mounting seat at intervals, and the first acceleration rollers group is provided with a first clamping channel for clamping the material tape, the second acceleration rollers group is provided with a second clamping channel for clamping the material tape, the second clamping channel is located on the discharging side of the first clamping channel, the first acceleration rollers group and the second acceleration rollers group are configured to drive the material tape to perform accelerate movement, so that the material tape sent out from the second clamping channel reaches a preset speed.

In an optional embodiment, the first acceleration rollers group comprises a first acceleration driving roller and a first driven roller, the first acceleration driving roller and the first driven roller are rotatably provided on the acceleration mounting seat and clearance-fitted to form the first clamping channel; the second acceleration rollers group comprises a second acceleration driving roller and a second driven roller, the second acceleration driving roller and the second driven roller are rotatably provided on the acceleration mounting seat and clearance-fitted to form the second clamping channel, the surfaces of the first driven roller and the second driven roller are both coated with an adhesive material, so as to adsorb impurities on the surface of the material tape through the first driven roller and the second driven roller.

In an optional embodiment, a first sticky roller and a second sticky roller are further rotatably provided on the acceleration mounting seat, the first sticky roller is in rolling contact with the first driven roller, so as to adhere impurities on the surface of the first driven roller; the second sticky roller is in rolling contact with the second driven roller, so as to adhere impurities on the surface of the second driven roller.

In an optional embodiment, a dust adsorption assembly is further provided on the acceleration mounting seat, and the dust adsorption assembly is provided between the first acceleration rollers group and the second acceleration rollers group, and configured to adsorb impurities on the material tape.

In an optional embodiment, the high-speed cutting device further comprises a deviation rectification mechanism, and the deviation rectification mechanism is provided on the mounting frame and located above the acceleration driving mechanism, and is configured to perform the deviation rectification on the material tape.

In an optional embodiment, the feeding mechanism comprises a feeding mounting seat and a feeding driving rollers group, the feeding mounting seat is provided on the mounting frame, and the feeding driving rollers group comprises a driving feeding roller and a driven feeding roller, the driving feeding roller and the driven feeding roller are rotatably provided on the feeding mounting seat, and form a feeding clamping channel for allowing the material tape to pass therethrough.

In an optional embodiment, the linear chasing-cutting mechanism comprises a linear drive assembly, a punching drive assembly and a cutter assembly, wherein the linear drive assembly is provided on the mounting frame, and located above the feeding mounting seat, the punching drive assembly is connected to the linear drive assembly for making linear reciprocating motion under the driving of the linear drive assembly, and the cutter assembly is connected to the punching drive assembly and connected to the feeding mounting seat for cutting the material tape under the driving of the punching drive assembly.

In an optional embodiment, a dust adsorption box is further provided on the discharging side of the feeding mounting seat, and the dust adsorption box is configured to suck away the scraps formed by cutting.

In an optional embodiment, the distance between the cutter assembly and the driving feeding roller is less than or equal to 70 mm.

The beneficial effects of the embodiments of the present disclosure include, for example:

in the high-speed cutting device provided by the embodiment of the present disclosure, the linear chasing-cutting mechanism is provided above the feeding mechanism, connected to the feeding mechanism, and configured to perform linear chasing-cutting on the material tape, the electrode guide plate is provided on the discharging side of feeding mechanism, and configured to guide the cut material tape, and the acceleration driving mechanism is provided on the discharging side of the electrode guide plate, and configured to perform acceleration driving on the material tape. Compared with the prior art, in the present disclosure, the acceleration driving mechanism is provided behind the linear chasing-cutting mechanism to realize the acceleration driving of the material tape, so that the feeding speed of the material tape reaches a preset value, this arrangement method makes the speed and acceleration of the linear chasing-cutting mechanism during linear chasing-cutting not too high, so that the linear chasing-cutting is completed at a relatively low speed, which can improve the precision and efficiency of the lamination preparation, and simultaneously also improve the stability of the mechanism better.

BRIEF DESCRIPTION OF DRAWINGS

In order to illustrate the technical solutions of the embodiments of the present disclosure more clearly, the drawings need to be used in the embodiments will be briefly introduced below, it should be understood that the following drawings only show some embodiments of the present disclosure, and therefore should not be regarded as a limitation of the scope, and for those ordinary skilled in the art, other relevant drawings can also be obtained in light of these drawings, without using any inventive efforts.

REFERENCE SIGNS

Figure 1:
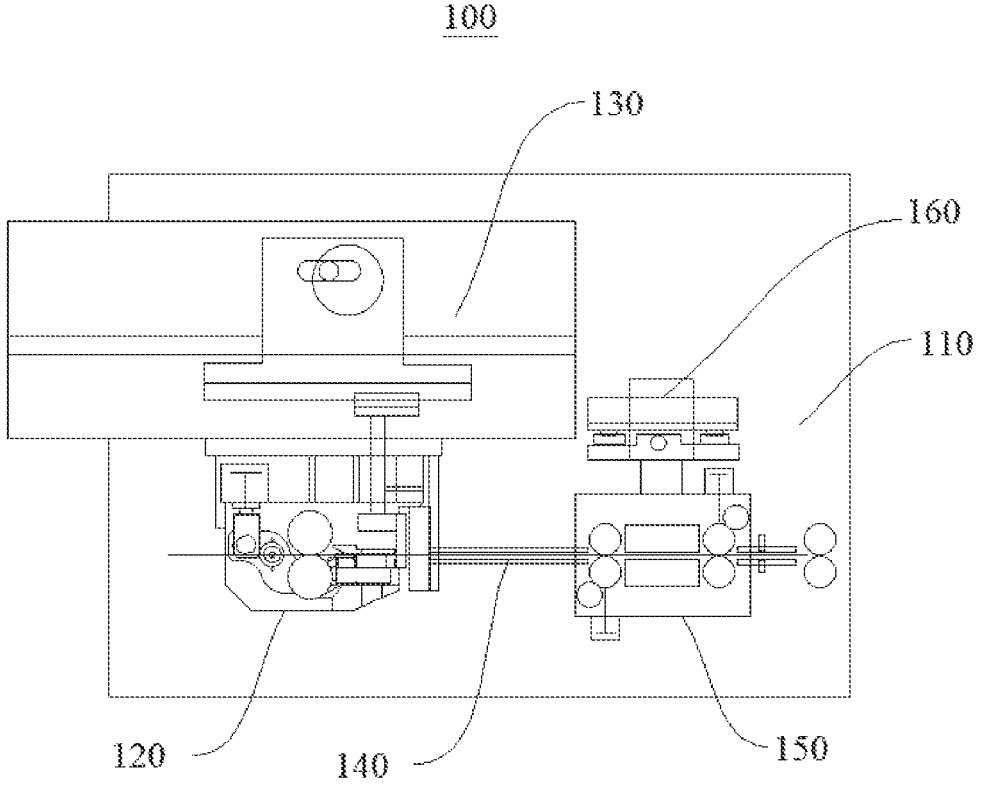
FIG. 1 is a structural schematic view of a high-speed cutting device provided by an embodiment of the present disclosure.

100—high-speed cutting device; 110—mounting frame; 120—feeding mechanism; 121—feeding mounting seat; 123—feeding driving rollers group; 1231—driving feeding roller; 1233—driven feeding roller; 125—adjusting cylinder; 130—linear chasing-cutting mechanism; 131—linear drive assembly; 133—punching drive assembly; 135—cutter assembly; 137—dust adsorption box; 140—electrode guide plate; 150—acceleration driving mechanism; 151—acceleration mounting seat; 153—first acceleration rollers group; 1531—first acceleration driving roller; 1533—first driven roller; 155—second acceleration rollers group; 1551—second acceleration driving roller; 1553—second driven roller; 157—first sticky roller; 158—second sticky roller; 159—dust adsorption assembly; 160—deviation rectification mechanism.

DETAILED DESCRIPTION OF EMBODIMENTS

In order to make the purposes, technical solutions and advantages of the embodiments of the present disclosure clearer, the technical solutions in the embodiments of the present disclosure will be clearly and completely described below in combination with the accompanying drawings in the embodiments of the present disclosure, obviously, the described embodiments are part of the embodiments of the present disclosure, rather than all embodiments. The components of the embodiments of the present disclosure, which are generally described and shown in the accompanying drawing herein, may be arranged and designed in a variety of different configurations.

Therefore, the following detailed description of the embodiments of the present disclosure provided in the accompanying drawings is not intended to limit the claimed scope of the present disclosure, but merely represents selected embodiments of the present disclosure. Based on the embodiments in the present disclosure, all other embodiments obtained by those ordinarily skilled in the art, without making inventive effort, fall within the protection scope of the present disclosure.

It should be noted that similar reference numerals and letters indicate similar items in the following accompanying drawings, therefore, once a certain item is defined in one drawing, it does not need to be further defined and explained in the subsequent drawings.

In the description of the present disclosure, it should be noted that the orientation or positional relationships indicated by the terms"upper", "lower", "inner" "outer" etc. are based on the orientation or positional relationship as shown in the accompanying drawings, or they are the orientation or positional relationships that the product of the invention is usually placed in use, merely for facilitating the description of the present disclosure and simplifying the description, rather than indicating or implying that related devices or elements have to be in the specific orientation, or configured and operated in a specific orientation, therefore, they should not be construed as limitations on the present disclosure.

Besides, terms "first", "second" etc., if appear, are merely for distinguishing the description, but should not be construed as indicating or implying importance in relativity.

As disclosed in the background art, in the existing process of lamination preparation, the material tape (electrode) usually needs to be cut with a cutter, and then the feeding action is completed. The existing cutting equipment has the following disadvantages:

1. When directional cutting is used, it is necessary to stop or reduce the speed of the material tape to ensure the cutting accuracy, which undoubtedly reduces the efficiency of lamination preparation.

2. When the linear chasing-cutting method is used, the movement speed and acceleration of the linear motor are both required to be relatively large, so that the cutter and the material tape are expected to be at the same speed to complete the cutting, however, it is difficult to precisely match the speed of the existing linear motor with the speed of the material tape, resulting in poor cutting precision and large movement acceleration, and it is difficult to ensure the stability of the mechanism.

3. Since a certain amount of waste dust may be generated during the cutting process, part of the dust may be adhered to the surface of the material tape, which affects the quality of subsequent products, making the short circuit rate of the compound plate relatively high.

In order to solve the above problems, the present disclosure provides a new type of high-speed cutting device, which can improve the precision and efficiency of lamination preparation, and simultaneously, also improve the stability of the mechanism better. It should be noted that the features in the embodiments of the present disclosure may be combined with each other without conflict.

First Embodiment

Referring to FIG. 1, the present embodiment provides a high-speed cutting device 100, which improves the precision and efficiency of lamination preparation and simultaneously also improves the stability of the mechanism better by accelerating after linear chasing-cutting.

The high-speed cutting device 100 provided in this embodiment includes a mounting frame 110, a feeding mechanism 120, a linear chasing-cutting mechanism 130, an electrode guide plate 140, an acceleration driving mechanism 150, and a deviation rectification mechanism 160, the feeding mechanism 120, and the linear chasing-cutting mechanism 130 and the acceleration driving mechanism 150 are both provided on the mounting frame 110, the feeding mechanism 120 is configured to convey the material tape, the linear chasing-cutting mechanism 130 is provided above the feeding mechanism 120, and the linear chasing-cutting mechanism 130 is connected to the feeding mechanism 120, and configured to perform the linear chasing-cutting on the material tape, the electrode guide plate 140 is provided on the discharging side of the feeding mechanism 120, and configured to guide the material tape after cutting, and the acceleration driving mechanism 150 is provided on the discharging side of the electrode guide plate 140, and configured to perform acceleration driving on the material tape. The deviation rectification mechanism 160 is provided on the mounting frame 110, and located above the acceleration driving mechanism 150, and configured to perform the deviation rectification on the material tape.

In this embodiment, the feeding mechanism 120 is configured to complete the feeding of the material tape, and simultaneously, a feeding roller is also provided on the discharging side of the acceleration driving mechanism 150 to facilitate subsequent feeding actions. It should be noted that the material tape herein refers to the electrode, which needs to be compounded with the separator before feeding, and the specific compound structure may refer to the existing cutting and feeding equipment.

In this embodiment, the electrode guide plate 140 is provided between the feeding mechanism 120 and the acceleration driving mechanism 150, and configured to guide the cut material tape to avoid the deviation of material tape during the conveying process. Simultaneously, in this embodiment, the acceleration driving mechanism 150 is provided behind the linear chasing-cutting mechanism 130 to realize the acceleration driving of the material tape, so that the feeding speed of the material tape reaches a preset value, this arrangement method enables not too high speed and acceleration of the linear chasing-cutting mechanism 130 during linear chasing-cutting, so that the linear chasing-cutting is completed at a relatively low speed, which can improve the precision and efficiency of the lamination preparation, and simultaneously also improve the stability of the mechanism better.

Figure 2:
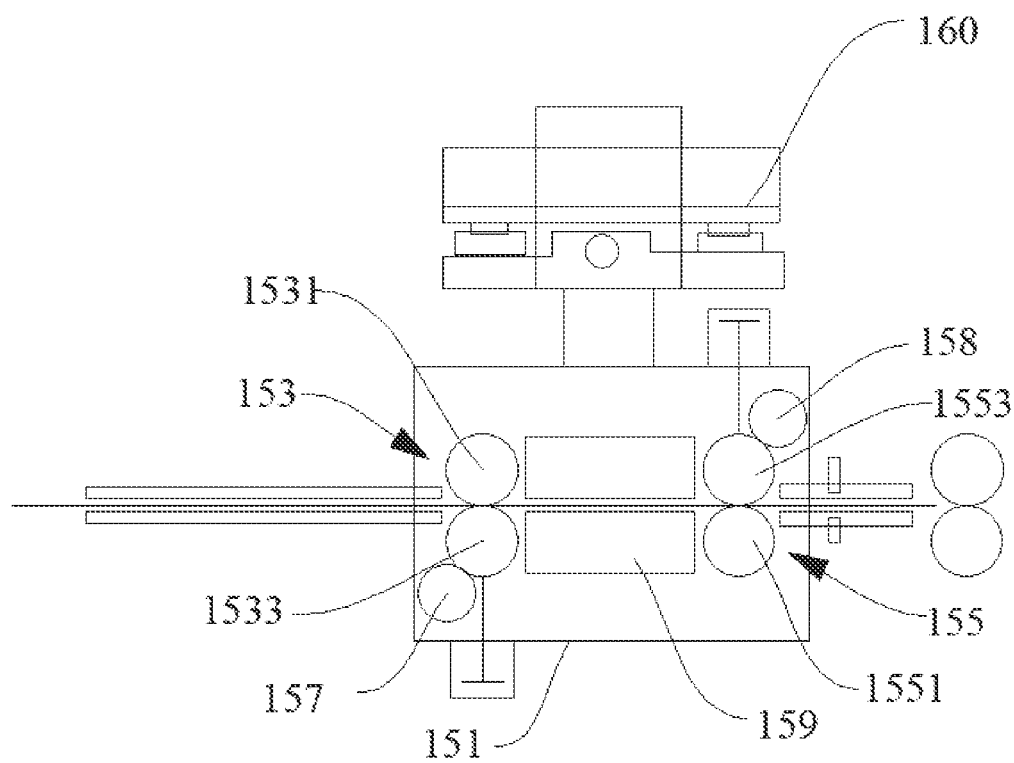
FIG. 2 is a schematic view of connection structure of a deviation rectification mechanism and an acceleration driving mechanism in FIG. 1.
Figure 3:
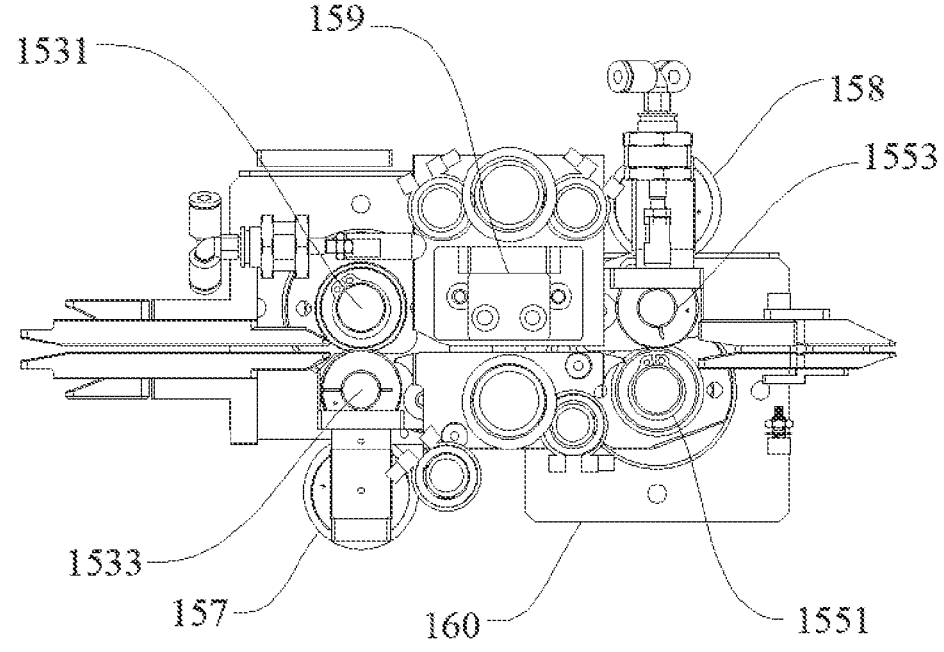
FIG. 3 is a structural schematic view of the acceleration driving mechanism in FIG. 1.

Referring to FIG. 2 and FIG. 3, in this embodiment, the acceleration driving mechanism 150 includes an acceleration mounting seat 151, a first acceleration rollers group 153 and a second acceleration rollers group 155, the acceleration mounting seat 151 is provided on the mounting frame 110, the first acceleration rollers group 153 and the second acceleration rollers group 155 are provided on the acceleration mounting seat 151 at an interval, and the first acceleration rollers group 153 is provided with a first clamping channel for clamping the material tape, the second acceleration rollers group 155 is provided with a second clamping channel for clamping the material tape, the second clamping channel is located on the discharging side of the first clamping channel, and the first acceleration rollers group 153 and the second acceleration rollers group 155 are configured to drive the material tape to perform accelerate movement, so that the material tape sent out from the second damping channel reaches a preset speed.

It should be noted that in this embodiment, the mounting height of the acceleration mounting seat 151 is the same as that of the feeding mechanism 120, so that the electrode guide plate 140 can guide the material tape horizontally, and the first acceleration rollers group 153 is close to the feeding side, the second acceleration rollers group 155 is close to the discharging side, and the first acceleration rollers group 153 and the second acceleration rollers group 155 jointly realize the acceleration action of the material tape, so that the material tape reaches a predetermined speed, so as to make the speed of the electrode matched with that of the separator.

The first acceleration rollers group 153 comprises a first acceleration driving roller 1531 and a first driven roller 1533, the first acceleration driving roller 1531 and the first driven roller 1533 are rotatably provided on the acceleration mounting seat 151 and clearance-fitted to form the first clamping channel; the second acceleration rollers group 155 comprises a second acceleration driving roller 1551 and a second driven roller 1553, the second acceleration driving roller 1551 and the second driven roller 1553 are rotatably provided on the acceleration mounting seat 151 and clearance-fitted to form the second clamping channel, the surfaces of the first driven roller 1533 and the second driven roller 1553 are both coated with an adhesive material, so as to adsorb impurities on the surface of the material tape through the first driven roller 1533 and the second driven roller 1553. Specifically, the first driven roller 1533 and the second driven roller 1553 are both coated with a material such as Teflon, which can directly adsorb impurities from the surface of the material tape in contact, so as to perform the cleaning on the material tape, which can effectively reduce the short circuit rate of the subsequently formed compound plate and improve the overall yield of the quality product.

In this embodiment, in order to ensure that both the upper and lower sides of the material tape can complete the adsorption of dust and impurities, the second driven roller 1553 and the first driven roller 1533 are respectively located on the upper and lower sides of the material tape. Specifically, the first acceleration driving roller 1531 and the second driven roller 1553 are located on the upper side of the material tape, the second acceleration driving roller 1551 and the first driven roller 1533 are located on the lower side of the material tape, the first acceleration driving roller 1531 and the second acceleration driving roller 1551 are provided in a staggered manner, and the first driven roller 1533 and the second driven roller 1553 are provided in a staggered manner, which can realize the adhesion of impurities on the upper and lower sides of the material tape.

In this embodiment, a first sticky roller 157 and a second sticky roller 158 are further rotatably provided on the acceleration mounting seat 151, the first sticky roller 157 is in rolling contact with the first driven roller 1533, so as to adhere impurities on the surface of the first driven roller 1533; the second sticky roller 158 is in rolling contact with the second driven roller 1553, so as to adhere impurities on the surface of the second driven roller 1553. Specifically, in order to further improve the adhesion effect, in this embodiment, the impurities adsorbed from the first driven roller 1533 and the second driven roller 1553 can be transferred by additionally providing the first sticky roller 157 and the second sticky roller 158, so that the first driven roller 1533 and the second driven roller 1553 can continuously adhere the dust and impurities on the material tape.

It should be noted that herein, in order to ensure that the first sticky roller 157 can transfer impurities from the first driven roller 1533, the second sticky roller 158 can transfer impurities from the second driven roller 1553, the adhesive force of the first sticky roller 157 should be greater than the adhesive force of the surface of the first driven roller 1533, and the adhesive force of the second sticky roller 158 should be greater than the adhesive force of the surface of the second driven roller 1553.

In this embodiment, a dust adsorption assembly 159 is further provided on the acceleration mounting seat 151, and the dust adsorption assembly 159 is provided between the first acceleration rollers group 153 and the second acceleration rollers group 155, and configured to adsorb impurities on the material tape. Specifically, the dust adsorption assembly 159 includes an upper adsorption box and a lower adsorption box, both the upper adsorption box and the lower adsorption box are connected to an external negative pressure pipeline to realize adsorption, the upper adsorption box is located on the upper side of the material tape, which can performing adsorption on the surface of upper side of the material tape, and the lower adsorption box is located on the lower side of the material tape, which can performing adsorption on the surface of lower side of the material tape, and further clean the dust impurities on the surface of the material tape.

In this embodiment, the deviation rectification mechanism 160 is provided above the acceleration mounting seat 151, and monitors the material tape through a deviation rectification sensor, the deviation rectification sensor detects the feeding position and size of the electrode, and feeds back a detection signal to a control module of the deviation rectification mechanism 160, wherein the deviation rectification mechanism 160 comprises a vertical deviation rectification assembly and a rotary deviation rectification assembly, the vertical deviation rectification assembly can adjust the position of the electrode in a direction perpendicular to the mounting frame 110, and the rotary deviation rectification assembly can adjust the angle of the electrode, and simultaneously, the first acceleration rollers group 153 and the second acceleration rollers group 155 can rectify the position of the electrode in a tape running direction, and after adjusting positions thereof in multiple directions through the deviation rectification mechanism 160, it accelerates rapidly on the premise of ensuring the accuracy of the feeding position, so that the speed of the electrode matches with the tap running speed of the separator.

Figure 4:
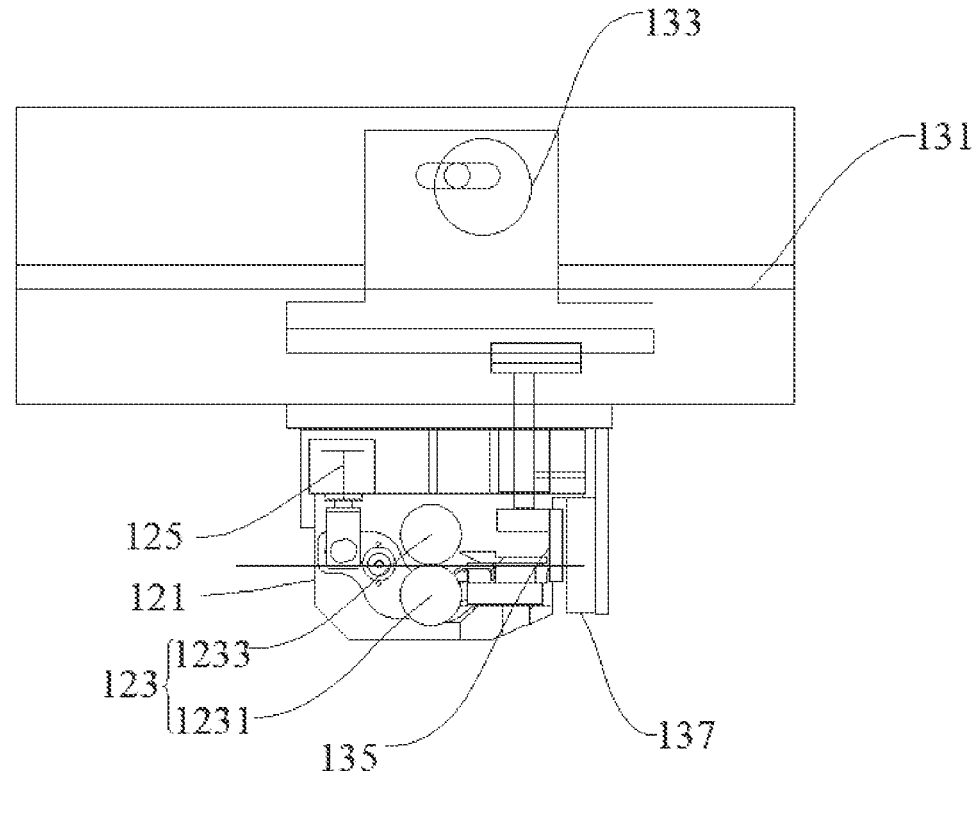
FIG. 4 is a schematic view of connection structure of a feeding mechanism and a linear chasing-cutting mechanism in FIG. 1.
Figure 5:
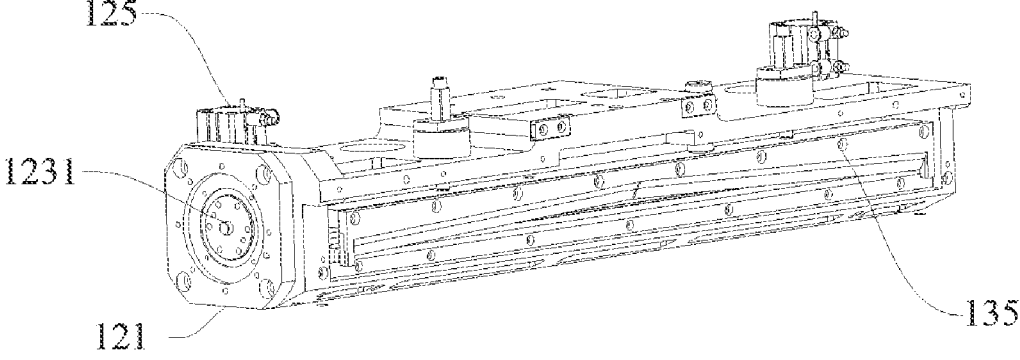
FIG. 5 is a structural schematic view of the feeding mechanism in FIG. 1.

Referring to FIG. 4 and FIG. 5, the feeding mechanism 120 comprises a feeding mounting seat 121 and a feeding driving rollers group 123, the feeding mounting seat 121 is provided on the mounting frame 110, and the feeding driving rollers group 123 comprises a driving feeding roller 1231 and a driven feeding roller 1233, the driving feeding roller 1231 and the driven feeding roller 1233 are rotatably provided on the feeding mounting seat 121, and form a feeding clamping channel for allowing the material tape to pass therethrough. Specifically, the feeding clamping channel is kept flush with the rear first clamping channel and the second clamping channel, so that the material tape is in the direction of horizontal transportation, the linear chasing-cutting mechanism 130 is connected to the feeding mounting seat 121, and configured to perform a linear chasing-cutting action on the material tape fed through the feeding driving rollers group 123.

The linear chasing-cutting mechanism 130 comprises a linear drive assembly 131, a punching drive assembly 133 and a cutter assembly 135, wherein the linear drive assembly 131 is provided on the mounting frame 110, and located above the feeding mounting seat 121, the punching drive assembly 133 is connected to the linear drive assembly 131 for making linear reciprocating motion under the driving of the linear drive assembly 131, and the cutter assembly 135 is connected to the punching drive assembly 133 and connected to the feeding mounting seat 121 for cutting the material tape under the driving of the punching drive assembly 133.

In this embodiment, the cutter assembly 135 includes a movable cutter and a fixed cutter, the fixed cutter is kept fixed in a vertical direction, and the movable cutter can reciprocate up and down under the driving of the punching drive assembly 133, thereby realizing cutting function. For the linear chasing-cutting process and related structures, the existing linear chasing-cutting equipment can be referred to.

In this embodiment, the linear drive assembly 131 is driven by a linear motor to reciprocate forth and back in the horizontal direction, so as to drive the punching drive assembly 133 and the material tape to maintain the same speed, thereby making the cutter assembly 135 and the material tape kept at the same speed in the horizontal direction to achieve linear chasing-cutting. Specifically, the punching drive assembly 133 includes a servo motor, an eccentric wheel, and a hexagonal guide column, wherein the servo motor is in transmission connection to the eccentric wheel, and the eccentric wheel is connected to the cutter assembly 135 through the hexagonal guide column, the servo motor drives the eccentric wheel to rotate, and uses the hexagonal guide column to drive the movable cutter to reciprocate up and down to realize the lamination preparation.

In this embodiment, an adjusting cylinder 125 is also provided on the feeding mounting seat 121, the adjusting cylinder 125 is configured to adjust the distance between the driving feeding roller 1231 and the driven feeding roller 1233 to adjust the width of the feeding clamping channel.

During feeding, the material tape passes through the cutter assembly 135 under the action of the feeding driving rollers group 123, at this time, the servo motor drives the eccentric wheel to rotate, and uses the hexagonal guide column to drive the movable cutter to reciprocate up and down to realize the lamination preparation, an in this process, the feeding driving rollers group 123 can use the adjusting cylinder 125 to adjust pressure to compress the material tape to ensure the accuracy of feeding and cutting, the eccentric wheel and the movable cutter are connected by the hexagonal guide post with each other to ensure the accuracy of displacement, which ensures the precision of cutting and lamination preparation, and reduces the risk of poor plate width during lamination preparation.

In this embodiment, a dust adsorption box 137 is further provided on the discharging side of the feeding mounting seat 121, and the dust adsorption box 137 is configured to suck away the scraps formed by cutting. Specifically, the dust adsorption box 137 is also connected to an external negative pressure pipeline, so as to form a negative pressure to suck away the scraps.

In this embodiment, the distance between the cutter assembly 135 and the driving feeding roller 1231 is less than or equal to 70 mm. The feeding driving rollers group 123 performs clamping and continuous feeding, wherein the driving clamping point is at a position not away from the cutter assembly 135, shortening the distance from the driving point to the cutter assembly 135 effectively reduces the relative position error of the electrode cutting point and the cutter caused by the bending of the electrode to improve the accuracy of lamination preparation. In addition, due to the small distance between the driving point and the cutter assembly 135, the rigidity of the electrode itself is enhanced, which can avoid the problem of coiling and material blockage of the electrode during driving.

To sum up, the working principle of the high-speed cutting device 100 provided in this embodiment is as follows.

In this embodiment, the feeding driving rollers group 123 is used to drive and clamp, before feeding, the electrode for performing the feeding and cutting, wherein the driving clamping point is at the position not away from the cutter assembly 135, shortening the distance between the driving clamping point and the cutter assembly 135, on the one hand, can effectively reduce the relative position error of the electrode cutting point and the cutter assembly 135 caused by the bending of the electrode to improve the accuracy of lamination preparation; on the other hand, due to the small distance between the driving clamping point and the cutter assembly 135, the rigidity of the electrode itself enhanced, which can avoid the problem of coiling and material blockage of the electrode during driving; the electrodes, with tape running, passes through the cutter assembly 135, and then passes through the first acceleration rollers group 153 and the second acceleration rollers group 155, the first acceleration rollers group 153 and the second acceleration rollers group 155 themselves remove dust in a form of driven wheel sticking dust, and simultaneously, the upper and lower surfaces of the electrode are also equipped with the dust adsorption assembly 159 to further remove dust, which effectively improves the yield of quality electrode and reduces the risk of short circuit; the electrode enters the first acceleration rollers group 153 and the second acceleration rollers group 155, and after being pressed by the rollers, at this time, the cutter assembly 135 cuts off the electrode, the positions, in multiple directions, of the electrode clamped by the first acceleration rollers group 153 and the second acceleration rollers group 155 at this time can be adjusted through the deviation rectification mechanism 160 to ensure the accuracy of the electrode feeding position; while rectifying the deviation, the first acceleration rollers group 153 and the second acceleration rollers group 155 speed up, so that the speed of the electrode and the speed of the separator are matched with each other, so as to achieve normal nesting, so that the tape running speed when the electrode is cut off and the movement speed of the linear motor do not need to be too large, and the acceleration of the linear motor does not need to be too large, the precision and efficiency of the lamination preparation may also be more easily guaranteed, and the stability of the mechanism has also been better improved.

The acceleration driving mechanism 150 is provided behind the linear chasing-cutting mechanism 130 to realize the acceleration driving of the material tape, so that the feeding speed of the material tape reaches the preset value, this arrangement method makes the speed and acceleration of the linear chasing-cutting mechanism 130 during linear chasing-cutting not too high, so that the linear chasing-cutting is completed at a relatively low speed, which can improve the precision and efficiency of the lamination preparation, and simultaneously, also improve the stability of the mechanism better.

The above are only specific embodiments of the present disclosure, but the protection scope of the present disclosure is not limited to this, all changes or substitutions, that any person skilled in the art can easily think of within the technical scope disclosed in the present disclosure, should fall within the protection scope of the present disclosure. Therefore, the protection scope of the present disclosure should be subject to the protection scope of the claims.

What is claimed is:

1. A high-speed cutting device, comprising a mounting frame, a feeding mechanism, a linear chasing-cutting mechanism, an electrode guide plate and an acceleration driving mechanism, wherein the feeding mechanism, the linear chasing-cutting mechanism and the acceleration driving mechanism are all provided on the mounting frame, the feeding mechanism is configured to convey a material tape, the linear chasing-cutting mechanism is provided above the feeding mechanism, connected to the feeding mechanism, and configured to perform linear chasing-cutting on the material tape, the electrode guide plate is provided on a discharging side of the feeding mechanism, and configured to guide the material tape after cutting, and the acceleration driving mechanism is provided on a discharging side of the electrode guide plate, and configured to perform acceleration driving on the material tape, wherein the feeding mechanism comprises a feeding mounting seat and a feeding driving rollers group, the feeding mounting seat is provided on the mounting frame, and the feeding driving rollers group comprises a driving feeding roller and a driven feeding roller, the driving feeding roller and the driven feeding roller are rotatably provided on the feeding mounting seat, and form a feeding clamping channel configured for allowing the material tape to pass therethrough, wherein the linear chasing-cutting mechanism comprises a linear drive assembly, a punching drive assembly and a cutter assembly, wherein the linear drive assembly is provided on the mounting frame, and located above the feeding mounting seat, the punching drive assembly is connected to the linear drive assembly and configured for making linear reciprocating motion under driving of the linear drive assembly, and the cutter assembly is connected to the punching drive assembly and connected to the feeding mounting seat and is configured for cutting the material tape under driving of the punching drive assembly, wherein a dust adsorption box is further provided on a discharging side of the feeding mounting seat, and the dust adsorption box is configured to suck away scraps formed by cutting;

wherein a distance between the cutter assembly and the driving feeding roller is less than or equal to 70 mm, and wherein the discharging side is a side that the material tape is exiting the cutter assembly.

2. The high-speed cutting device according to claim 1, wherein the acceleration driving mechanism comprises an acceleration mounting seat, a first acceleration rollers group and a second acceleration rollers group, and the acceleration mounting seat is provided on the mounting frame, the first acceleration rollers group and the second acceleration rollers group are provided on the acceleration mounting seat at an interval, wherein the first acceleration rollers group is provided with a first clamping channel configured for clamping the material tape, the second acceleration rollers group is provided with a second clamping channel configured for clamping the material tape, the second clamping channel is located on a discharging side of the first clamping channel, and the first acceleration rollers group and the second acceleration rollers group are configured to drive the material tape to perform accelerate movement, so that the material tape sent out from the second clamping channel reaches a preset speed.

3. The high-speed cutting device according to claim 2, wherein the first acceleration rollers group comprises a first acceleration driving roller and a first driven roller, the first acceleration driving roller and the first driven roller are rotatably provided on the acceleration mounting seat and clearance-fitted to form the first clamping channel; the second acceleration rollers group comprises a second acceleration driving roller and a second driven roller, the second acceleration driving roller and the second driven roller are rotatably provided on the acceleration mounting seat and clearance-fitted to form the second clamping channel, and surfaces of the first driven roller and the second driven roller are both coated with an adhesive material, so as to adsorb impurities on a surface of the material tape through the first driven roller and the second driven roller.

4. The high-speed cutting device according to claim 3, wherein a first sticky roller and a second sticky roller are further rotatably provided on the acceleration mounting seat, the first sticky roller is in rolling contact with the first driven roller, so as to adhere impurities on a surface of the first driven roller; and the second sticky roller is in rolling contact with the second driven roller, so as to adhere impurities on a surface of the second driven roller.

5. The high-speed cutting device according to claim 2, wherein a dust adsorption assembly is further provided on the acceleration mounting seat, and the dust adsorption assembly is provided between the first acceleration rollers group and the second acceleration rollers group, and configured to adsorb impurities on the material tape.

6. The high-speed cutting device according to claim 1, wherein the high-speed cutting device further comprises a deviation rectification mechanism, and the deviation rectification mechanism is provided on the mounting frame and located above the acceleration driving mechanism, and is configured to perform deviation rectification on the material tape.

* * * * *